Jan. 13, 1970     D. E. MARSHALL, JR     3,490,034
MAGNETOMETER UTILIZING THE DELAYING EFFECT OF A MAGNETIC
TRANSMISSION LINE
Filed Nov. 18, 1966     3 Sheets-Sheet 1

INVENTOR.
DONALD E. MARSHALL JR.
BY Joseph P. Kates
ATTORNEY

INVENTOR.
DONALD E. MARSHALL JR.
BY Joseph P. Kates
ATTORNEY

United States Patent Office 3,490,034
Patented Jan. 13, 1970

3,490,034
MAGNETOMETER UTILIZING THE DELAYING EFFECT OF A MAGNETIC TRANSMISSION LINE
Donald E. Marshall, Jr., Framingham, Mass., assignor to Burroughs Corporation, Detroit, Mich., a corporation of Michigan
Filed Nov. 18, 1966, Ser. No. 595,462
Int. Cl. G01r 33/02
U.S. Cl. 324—43                                              15 Claims

ABSTRACT OF THE DISCLOSURE

The present disclosure describes a magnetometer comprising a magnetic transmission line of the parallel flat type adapted to be energized from a source of electromagnetic wave energy, and means for measuring the delay in propagation down the line when the transmission line is brought into the presence of an external magnetic field. Propagation velocity is a direct function of the external magnetic field and the delay varies accordingly. In accordance with the disclosure, the transmission or delay line comprises separated flat conductive elements with one or more layers of magnetic material therebetween and may comprise layers of deposited thin magnetic film and dielectric material. The orientation of the magnetic material in the transmission line has been selected to make the line most sensitive to external fields.

---

The present invention relates generally to magnetometers and more specifically relates to a method and apparatus for determining the characteristics of magnetic fields by detecting and measuring their delaying effect on electromagnetic waves propagated along a transmission line.

The magnetometer structure of the present invention comprises a source of electromagnetic wave energy, at least one transmission line or delay line of the parallel flat type connected electrically to receive the energy and propagate it down the line in the TEM (Transverse Electromagnetic) mode, and a detecting means to measure the delay along the line produced when the delay line is brought into proximity to a magnetic field of unknown intensity and direction. Since, in the transmission line provided, progagation velocity is a direct function of an applied magnetic field, delay varies accordingly. The delay line, or lines, are rotated or otherwise oriented with respect to the magnetic field to angular alignments where maximum and minimum delays are observed. These maximum and minimum delay positions are parallel or anti-parallel to the direction of the magnetic field to be measured. The delay line comprises a pair of separated flat conductive elements with layers of magnetic material which may be thin-film depositions and of dielectric material interposed between the conductors. The magnetic material is oriented so as to make the delay line most sensitive to external fields.

Representative of the magnetometer art are the Schmidt magnetometer, the coil inductor, the earth inductor, the saturable core magnetometer, the variable resistance magnetometer, and the electron-beam magnetometer. Prior art devices are not adequately sensitive and/or are bulky, complex instruments which are both delicate and expensive to construct. Patented magnetometer devices include that of U.S. Patent 2,844,789 to P. J. Allen for Microwave Magnetic Detectors, issued July 22, 1958; that of U.S. Patent 2,977,648 to R. M. Bozorth for Magnetic Field Detector, issued Aug. 22, 1961, and that of U.S. Patent 2,597,149 to T. Kahan for Ultrahigh-Frequency Magnetometer, issued May 20, 1952. Delay lines in the patented art include that of U.S. Patent 3,019,398 to C. E. Wellman, Jr., for Electrical Delay Line, issued Jan. 30, 1962, and that of U.S. Patent 2,897,294 to D. M. Lipkin for Transverse Magnetic Travelling Wave Amplifier, issued July 28, 1959.

In the Allen patent, the effect of electromagnetic waves from a klystron source on a rod of ferromagnetic spinel coaxially mounted in a circular waveguide is observed. The application of the Faraday effect is utilized rather than the application of the change in permeability and resultant change in delay employed in the present invention. The device of the Kahan patent uses an effect of a change in permeability, but as it affects the reflectivity of a magnetic material at microwave frequencies. The Bozorth patent utilizes the varying resistance characteristics of certain metals in a magnetic field as by a square law and employs three perpendicular magnetometer elements serially connected in a resistance network. The electrical delay line of the Wellman patent involves an effect of a change in permeability, which in turn varies delay but by means of saturating the magnetic material rather than by the means and method of the present invention which in its principle of application may use the properties of an oriented magnetic film. The Lipkin patent illustrates a delay line incorporating a ferrite ferromagnetic dielectric such as a coaxial continuous parameter delay line designed around a tube of ferrite. These devices suffer the above-mentioned deficiencies of prior art devices whereas the transmission line magnetometer of the present invention is substantially different in principle of application from the patented devices and from the devices of prior art and overcomes these deficiencies.

The present invention has numerous advantages over prior art devices. These include provision and use of equipment of small size, light weight and rugged construction. The invention provides magnetic field information in a form which is readily converted to a desired type of output and without the use of extremely high frequencies, or sensitive and costly equipment. The invention provides an output which is a predictable function of magnetic field strength and it is, therefore, capable of producing an absolute measure of field strength.

An object of the present invention is to provide a magnetometer means and method of determining the direction and magnitude of a magnetic field wherein the magnetometer means is of small size, light weight and of rugged construction.

Another object of the present invention is to provide a magnetometer means and method of detecting the direction and magnitude of a magnetic field wherein magnetic field information will be provided in a form readily convertible to any desired output without the use of extreme high frequencies or sensitive and costly equipment.

Another object of the present invention is to provide a magnetometer means and method which will produce an output which is a predictable function of magnetic field strength, and is capable of readily producing an absolute measure of field strength.

Another object of the invention is to provide a magnetometer adaptable to be made of small size, light weight, rugged construction and which is economical to produce and use to detect the direction and magnitude of a magnetic field as a predictable function of its field strength, which may provide an absolute measure of field strength and which avoids necessity for capability of operation at extremely high frequencies.

While the novel and distinctive features of the invention are particularly pointed out in the appended claims, a more expository treatment of the invention, in principle and in detail, together with additional objects and advantages enumerated or apparent therefrom is afforded by the following description taken in conjunction with the accompanying drawings in which:

Figure 9:
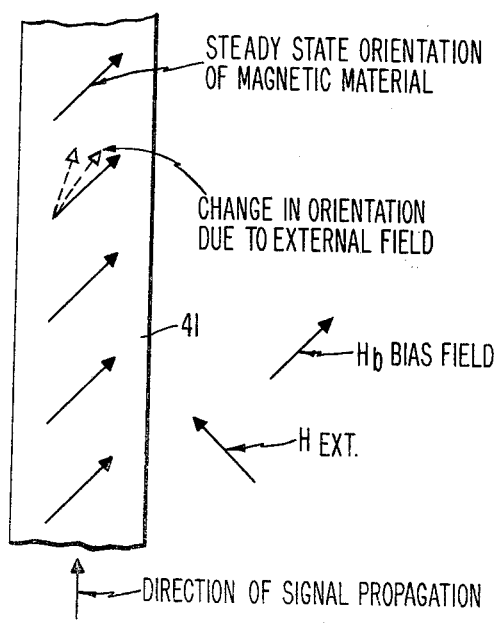
Figure 10:
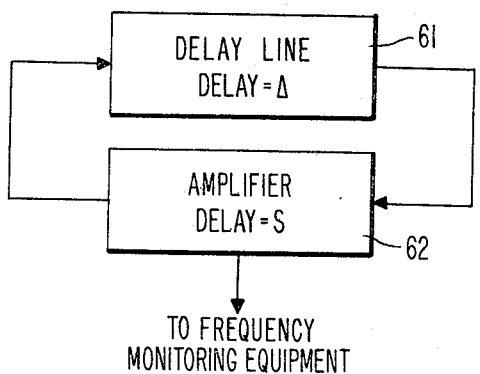
Figure 11:
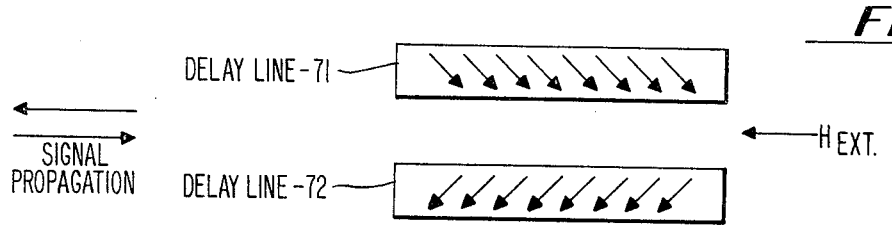
Figure 12:
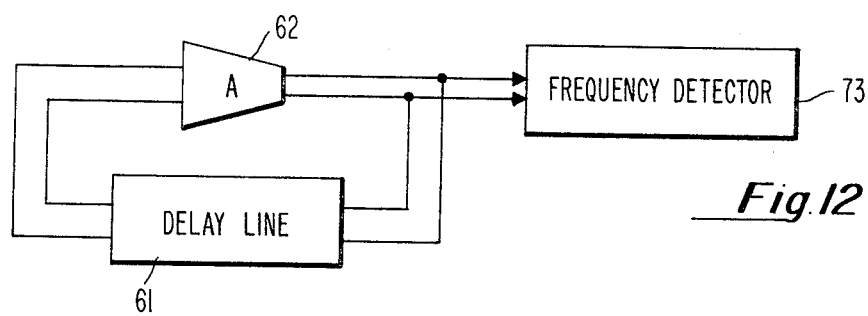
Figure 13:
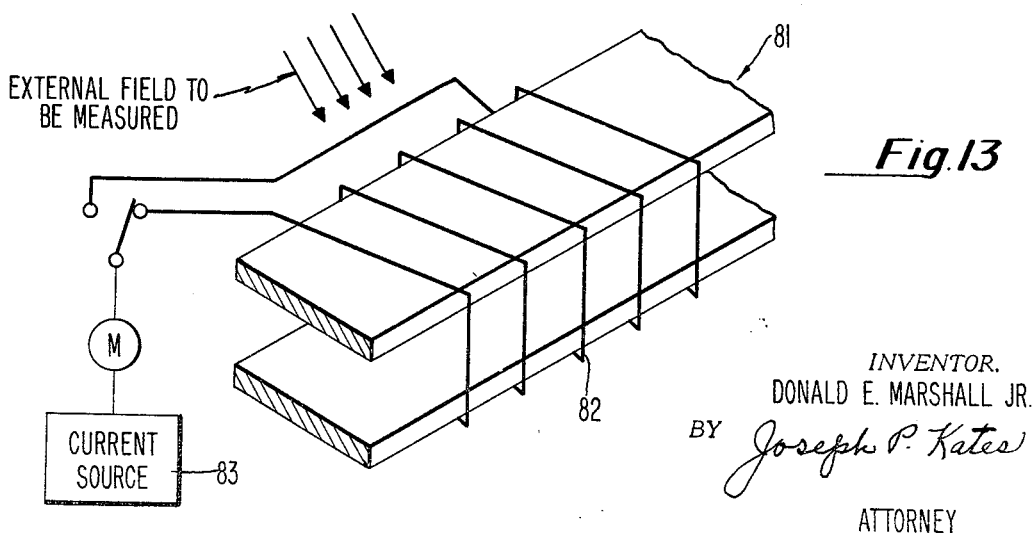

FIG. 9 is a partially pictorial and partially schematic representation of another embodiment of the invention wherein a bias field is applied such that steady state orientation results which may be rotated polarly from a direction parallel to the upper and lower surfaces, if desired and wherein upon signal propagation along the transmission line axis a change in orientation from that produced by the bias field due to the external magnetic field may be observed and measured;

FIG. 10 is a representation of a portion of another embodiment of the magnetometer of the invention showing the transmission line of the inventive magnetometer combined with an RF (radio frequency) amplifier to form an oscillator, frequency monitoring means being connected responsive to the oscillator such that the strength of the field may be determined by measuring the change in oscillator frequency;

FIG. 11 is a schematic representation of the delay lines of another embodiment of the invention wherein two delay lines with initial polarization in directions normal to each other as shown are used with appropriate comparison circuitry to measure an externally applied field since the field will increase delay in one line and reduce it in the other;

FIG. 12 is a block diagram of the oscillator of FIG. 10 wherein a frequency detector is provided to detect changes in oscillator output frequency due to the unknown magnetic field applied;

FIG. 13 is a frequency partially pictorial and partially schematic view of still another embodiment of the invention showing the delay line employed in a method and means wherein an external reference field is applied to the transmission line in addition to the field to be measured by using a solenoid constructed by winding a nonmagnetic conductor around a two conductor delay line such as shown in FIGS. 2, 3, 4 and 5 so as to orient the reference field with its axis concentric with the center line or X direction of the transmission line.

The magnetometer of the invention as illustrated in the several embodiments described herein provides an apparatus and method in which the direction and magnitude of a magnetic field may be detected by means of a change in the propagation velocity of an electromagnetic wave travelling down a transmission line which is provided. The transmission line is of the parallel flat conductor type known commonly as "strip-line" or "micro-strip."

Figure 1:
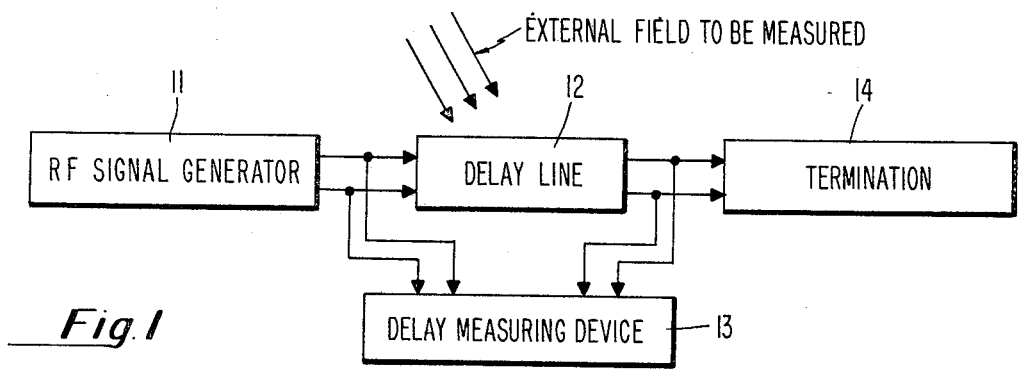
FIG. 1 is a block diagram of a first preferred illustrative embodiment of the delay line magnetometer of the invention showing orientation and positioning of the delay line portion in proximity to an external field to be measured.

Refer to FIG. 1. An RF signal generator 11, a delay line 12, a delay measuring device 13, termination means 14 and interconnecting means (not numbered) are provided. Means 11, 12 and 13 each are conventional commercial units and any one of several types of each could be utilized. While not to be restricted thereto, for example, in the illustrative embodiment the RF generator 11 could be the type available commercially and known as the Hewlett-Packard 606 RF signal generator, the delay measuring device 13 could be a cathode ray oscilloscope capable of dual trace, for example, the commercially available Tektronics 535 Cathode Ray Oscilloscope. Terminating means 14 may comprise a terminating resistor the impedance of which matches the delay line impedance. While not to be restricted to this range, the signal generator 11 may be capable of operation at frequencies ranging from one to ten megacycles. The output of the RF signal generator 11 is fed into delay line 12 and into a delay measuring device 13. The output of the delay line 12 is also fed into the delay measuring device 13. Delay measuring device 13 is capable of measuring the delay between the signal output of the RF signal generator 11, which is fed into delay line 12 and the output from delay line 12, which delay occurs upon the propagation of the RF signal along the delay line 12. The delay line or transmission line 12 is terminated by termination means 14.

Thus, as shown in FIG. 1 a transmission line is magnetized properly, brought in proximity to a magnetic field to be measured and oriented with respect to the field, RF energy is propagated along the transmission line and by detecting and measuring the effect of an external field in causing delay of RF, signal propagation through delay line means 12 is observed and measured. The constant of proportionality can be found by measuring fields of known strength. The field direction is determined by changing the orientation of the delay line 12 (or delay line 61 of FIG. 12 as will be described) relative to the external field to be measured until the delay is maximized or minimized. The other embodiments are similarly oriented.

An accurate measurement may be obtained by orienting the delay line 12 (or delay line 61) parallel and then anti-parallel to the external field and determining the difference between the maximum and minimum delays obtained. This measurement eliminates the need for an accurate calibration of the delay under zero external field conditions, and minimizes the effects of temperature and other ambient conditions wherein tendency to drift might cause error. The delay line 12 may comprise a transmission line, or may comprise two transmission lines.

Refer to FIG. 11. If two transmission lines are used, they may be oriented so that their axes of anisotropy are normal to each other. An external applied field with a longitudinal component then will reduce the delay in one of the transmission lines while increasing it in the other. Maximizing the difference in delays and determining the difference magnitude will provide field magnitude and direction.

Figure 2:
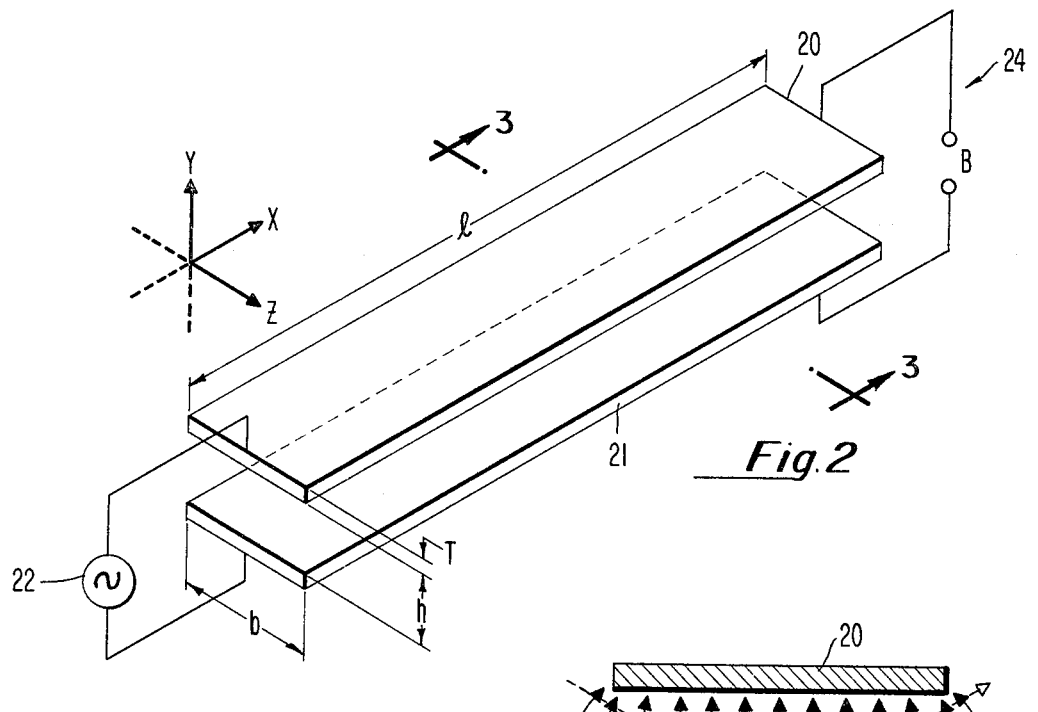
FIG. 2 is a partially schematic and partially pictorial and diagramatic representation of the signal generator, the termination device and the portion of the delay line of the embodiment of FIG. 1 comprising parallel flat conductor members to facilitate a theoretical discussion of the principles of the invention and also illustrating the axes and dimensions of the delay line conductor members.

Alternatively, the unknown magnetic field direction may be obtained by employing three delay lines of the type and in circuit arrangement of the several embodiments described herein, for example, and positioning the three delay lines or transmission lines perpendicular to one another, for example, along the $x$, $y$, and $z$ axes, respectively, as illustrated in FIG. 2, to find the three cartesian components of the field. The RF signal should be kept small so that its magnetic field does not disturb the film magnetization vector significantly.

Refer to FIG. 2 to introduce in greater detail the operation of the transmission line magnetometer of the invention. Provided, and to be considered is the parallel plate transmission line comprising flat conductive members 20 and 21. The symbol > denotes "is greater than." The thickness of the plate $T$, the distance between plates $h$, the conductor width $b$ and conductor length $l$, and the $x$, $y$ and $z$ axes are indicated in FIG. 2. Approximate relative dimensions may be as follows:

$$l > 100b$$
$$b > 10h$$
$$h > T$$

An AC generator 22 is provided similar to and which may be the RF signal generator 11 of FIG. 1. A pair of input leads (not numbered) connect the output terminals of generator 22 to the respective flat conductor plates 20 and 21. AC generator 22, plates 20 and 21 of the delay line, and these leads may correspond to RF generator 11, the conductive members of the delay line 12, and to the leads between RF signal generator 11 and delay line 12 in the embodiment of FIG. 1. Termination means 24 which may comprise a pair of output leads (not numbered) and a pair of terminals B may be provided and may correspond to the termination means 14 of FIG. 1. Generator 22 provides an AC (alternating current) input through the two input leads (not numbered) to the flat conductor plates 20 and 21. The input signal after delay in transmission through the conductors 20 and 21 appears at the terminals B of termination means 24 at some later time depending upon the length of the delay line comprising the plates 20 and 21 and the propagation velocity of the electromagnetic wave down the line.

Figure 3:
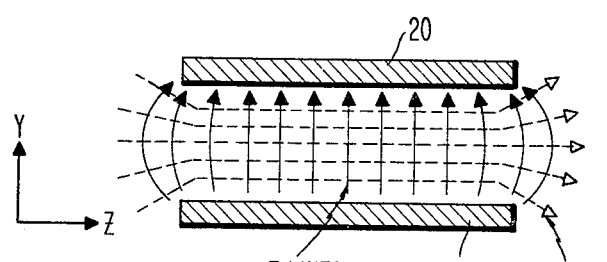
FIG. 3 is a cross-sectional view of the delay line of FIG. 2, taken in the direction of the arrows 3—3 illustrating the electrical and magnetic field characteristics at one instant of propagation in the TEM mode along the line and also illustrating the small fringing effect, the direction of wave propagation being into the drawing.

Refer to FIG. 3. The E (electrical field) and H (magnetic field) lines in the TEM mode which is characteristic of this type of line is shown at one instant of time at the position of lines 3—3 on the delay line in FIG. 2 and in the $y$-$z$ plane, and with the direction of wave propagation being into the drawing. The small fringing effect which occurs is shown by the changed direction of lines at the left and right extremities of FIG. 3 along with the parallel arrowed lines (not numbered) denoting the E (electric) and H (magnetic) field directions in the TEM mode.

The propagation velocity of the electromagnetic wave is inversely proportional to the square root of the permeability and the permittivity of the propagation medium. Since nearly all of the electromagnetic field is confined to the space between the two conductors the propagation velocity is especially dependent upon these properties of the medium between the two conductors 20 and 21.

Figure 4:
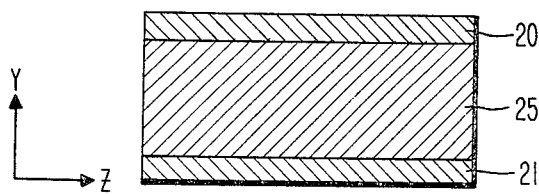
FIG. 4 is a cross-sectional view of a delay line for a delay line magnetometer similar to the showing of FIGS. 2 and 3, but with a magnetic material of high relative permeability with respect to free space in the direction of the H field and a permittivity near that of free space interposed between the conductive members.

Refer to FIG. 4. In the space between conductors 20 and 21 magnetic material 25 may be provided. Magnetic material 25 may have properties of relative permeability (with respect to free space) of 4,000 in the direction of the H field, and a permittivity near that of free space. Placing such material between the two conductors causes the propagation velocity to be reduced by a factor of approximately 63. Magnetic material of relative permeabilities of this order of magnitude of 4,000 can be readily obtained with nickel-iron mixtures known as permalloys.

In an oriented magnetic film at field strengths below the coercive field of the film, maximum permeability occurs in a direction along the "hard axis." This "hard axis" direction is transverse to the "easy axis" or direction of uniaxial anisotropy.

Figure 5:
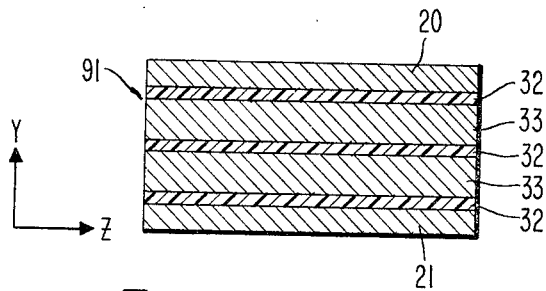
FIG. 5 is a cross-sectional view of the delay line of the magnetometer of the first preferred embodiment of FIG. 1 illustrating the disposition of dielectric material layers interposed between magnetic material layers and the conductors of the delay line in a practical embodiment of the principles illustrated in FIGS. 1–4.

Refer to FIG. 5. A multilayer laminated structure consisting of laminae including flat conductors 20 and 21, layers of dielectric material 32 and layers of magnetic material 33 similar to and corresponding to magnetic material 25 of FIG. 3 may be provided. As in the case of magnetic material 25, magnetic materials 33 are formed of magnetic material of permeability of about 4,000 in the direction of the H field.

The plates, or flat conductors 20 and 21, are separated by the magnetic material layers 33. Between one of the layers of magnetic material 33 and conductor 20 and between the two layers of magnetic material 33, and also between one of the layers of magnetic material 33 and the conductor 21, are interposed the layers of laminae of dielectric material 32.

The magnetic material 33 (or 25) between the conductors 20 and 21 which comprise nickel-iron mixtures (permalloys) have a relatively low resistance. Hence, appreciable signal attenuation would result if some means were not used to increase resistivity. The dielectric layers 32 provide this resistivity. Although shown as three layers of dielectric material 32 for purposes of illustration, it will be understood that the number of layers may be one or more, depending on the results, specific dimensions, and material properties desired. The propagation delay is dependent upon the equivalent permeability and permittivity which are a function of individual characteristics of the two materials (magnetic material 33 and dielectric material 32) times their respective volumes divided by the total volume. In practical cases the equivalent permeability of the combined materials should approach eighty to ninety percent of the permeability of the magnetic material 33.

Consider the effect of providing a nickel-iron film between the conductors 20 and 21 of the transmission lines with the uniaxial anisotropy axis (the easy or preferred axis) along the direction of signal propagation (X direction, see FIGS. 2 and 3). Let the film be characterized by an anisotropy field $H_k$, which is a measure of anisotropy energy, or the force which restrains the magnetic dipoles of the film to line up along the anisotropy axis. The transverse permeability $\mu_T$ in the transverse or hard axis direction of the film, determines the signal propagation velocity since the magnetic field of the signal is also transverse to the axis of anisotropy. It has been shown experimentally that $\mu_T$ is essentially constant for an external transverse Z field $H_T$ strong enough to rotate the film magnetization vector by up to approximately 50° or 60° ("°" is the symbol for degrees) from the anisotropy axis direction. For a magnetic field $H_L$ applied in the longitudinal X direction, $\mu_T$ varies as $$\frac{H_K}{H_K + H_L}$$

A magnetic field in the transverse Y direction will have negligible effect on a thin film due to the large "shape" demagnetizing force which tends to keep the magnetization vector in the plane of the film.

Thus for an external field $H_e$, with components:

$$H_e = \bar{i} H_L + \bar{j} H_{yY} + \bar{k} H_T$$

where $H_L = \cos\theta H_e$, and $\theta$ is the angle between the external field and component in the plane of the film and the preferred axis.

Then for a small signal propagating down the line, the propagation delay is, $\delta$:

$$\delta \propto \sqrt{\mu_T} \propto \sqrt{\frac{H_K}{H_K+H_L}} = \sqrt{\frac{H_K}{H_K+H_e\cos\theta}} = \frac{K}{\sqrt{1+\frac{H_e}{H_K}\cos\theta}}$$

where $H_e < H_K/2$ for a good approximation and K is a constant of proportionality.

Note that if $H_e$ has a component parallel to the axis of anisotropy, the delay decreases and if $H_e$ has a component anti-parallel to the axis of anisotropy, the delay increases.

The above relationship does not include the effect of the demagnetizing field which will result from the high length-width ratio of the transmission line. This field adds an additional constraint on the film magnetizing vector tending to maintain it along the length of the film (X direction). The effect will be to reduce the film permeability and the delay sensitivity to external fields.

Figure 6:
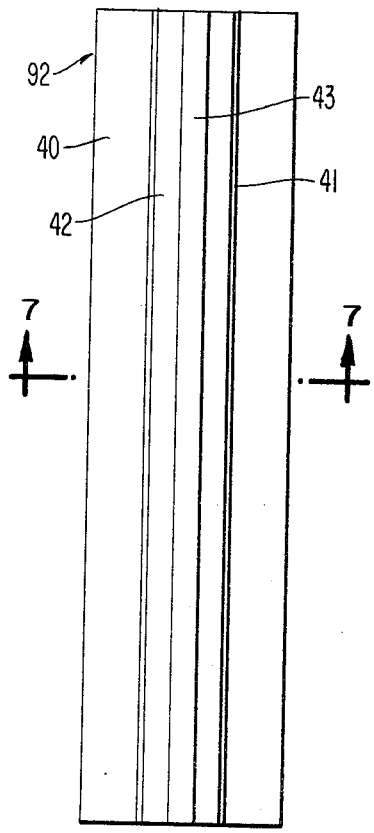
FIG. 6 is a plan view of a second embodiment of the delay line of the invention, showing a deposited delay line suitable for incorporation in the first preferred illustrative embodiment magnetometer of FIG. 1.
Figure 7:
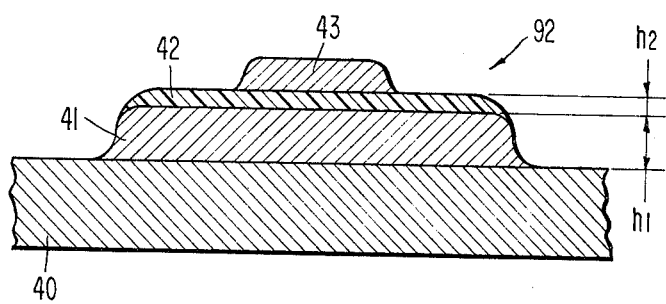
FIG. 7 is a cross-sectional view of the deposited delay line of FIG. 6 taken along the lines 7—7.
Figure 8:
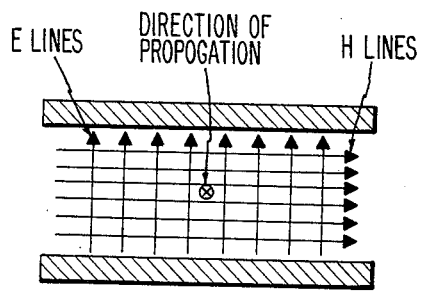
FIG. 8 is a schematic representation of the delay line of FIGS. 6 and 7 with the deposited magnetic film and insulator film left out to facilitate illustration of the field lines, but neglecting fringing, the direction of propagation being into the dawing.

Now refer to FIGS. 6, 7, and 8 which illustrate an embodiment of the invention comprising a deposited delay line magnetometer.

A conductive substrate 40 and a top conductor 43 may be provided and form the signal conductors of the delay line magnetometer of the invention. A high $\mu$ (permeability) magnetic material 41 such as permalloy, is deposited between the conductive substrate 40 which is provided and the top conductor 43.

The substrate 40 is the ground plane and the top conductor 43 conveys the signal. Between the upper surface of the high $\mu$ oriented film of magnetic material 41 and the top conductor 43, is deposited an insulative film or insulating layer 42. In FIG. 7 the dimension $h_1$ represents the thickness of the high $\mu$ oriented film 41 and the dimension $h_2$ represents the thickness of the insulator film 42. These dimensions $h_1$ and $h_2$ are such that the delay per unit length is primarily determined by the magnetic material.

This requires:
$$\mu_p h_1 \gg \mu_i h_2$$
where:

$u_p$ = permeability of the magnetic material
$u_i$ = permeability of the insulator material $\approx \mu_0$
$h_1$ = height of magnetic film (thickness)
$h_2$ = height of insulator (thickness)
$\gg$ means is much greater than
$\approx$ means is similar to.

Transmission of energy down the line is by the TEM mode. Therefore the field lines (neglecting fringing) are as illustrated in FIG. 8. With the direction of propagation into the paper, the (magnetic) H lines will be from left to right and the (electric) E field lines will be upwards.

The magnetic material is oriented with the easy axis at an angle to the H field in the delay line which makes the delay per unit length most sensitive to external fields. Orientation may be achieved by the application of a magnetic field during deposition, or by a bias field ($H_b$).

Refer to FIG. 9. The delay line which may be the delay line of FIGS. 6–8, for example, is subjected to a bias field $H_b$ as illustrated by the solid arrowed line bearing the legend "$H_b$ BIAS FIELD." The $H_b$ bias field provides the magnetic material 41 with a steady state orientation illustrated in FIG. 9 by the solid arrowed lines, the top solid line of which bears the legend "STEADY STATE ORIENTATION OF MAGNETIC MATERIAL." This steady state orientation of the magnetic material is changed upon an application of an external magnetic field. The external magnetic field is illustrated by the solid arrow bearing the notation "$H_{EXT}$." This change from steady state orientation is illustrated by the arrowed lines shown in phantom and bearing the legend "CHANGE IN ORIENTATION DUE TO EXTERNAL FIELD." The magnetometer usually is brought to and the delay line is aligned with respect to the external field. It is, however, within the scope of the present invention that for some purposes the external field to be measured as to magnitude and/or direction may be applied to the magnetometer delay line and either the steady state or external field aligned with respect to the other. The illustrated alignment of FIG. 9 is with the delay line positioned such that its magnetic material direction of steady state orientation is made perpendicular to the direction of the external magnetic field. Superimposed on the magnetic material 41 (as shown in FIG. 7 also), there may be a top conductor 43 omitted from FIG. 9 to facilitate illustration of the effects of the magnetic fields. The direction of signal propagation along the conductor 43 as shown by the arrow designated with the legend "DIRECTION OF SIGNAL PROPAGATION." The conductive substrate 40 (not illustrated in FIG. 9) is the ground plane.

Thus, an external magnetic field with a component $H_{EXT}$ changes the direction of orientation of the magnetic dipoles, modifying the effective permeability of the magnetic material 41 perpendicular to the direction of signal propagation and changes the phase constant and overall delay of the delay line. Refer to FIGS. 10 and 12. A delay line or transmission line 61 and an RF amplifier 62 are provided and connected together such that the output of the amplifier 62 is fed back via a regenerative feedback path to its input. The regenerative feedback path comprises connecting means (not numbered) from the output of the RF amplifier 62 to the input end of the delay line 61 and connecting means from the output end of delay line 61 into the input of RF amplifier 62. Thus, delay line 61 is employed in a timing circuit to form the delay means which operating in association with RF amplifier 62 provides an oscillator. As illustrated in FIG. 10, frequency monitoring equipment is provided, for example, frequency detector 73 is provided in the FIG. 12 embodiment and may be wired to the output of the oscillator comprising amplifier 62 and delay line 61 to be responsive to the oscillator so that from the oscillator output a measure of the external field strength component $H_{EXT}$ may be obtained. If the delay through the RF amplifier 62 is small compared to the delay through the transmission line 61, the frequency of oscillation is nearly equal to an integer times the reciprocal of the delay time, since the total phase shift around the loop must be a multiple of $2\pi$ radians. For an inverting amplifier, the transmission line 61 will have a delay equal to $\pi$ plus a multiple of $2\pi$ radians. The strength of the field is determined by measuring the change in oscillator frequency. Undesired harmonics can be eliminated by frequency trapping in the amplifier 62. Thus for accurate measurement the delay $\Delta$ of the delay line 61 in the regenerative feedback path from the output to the input of the amplifier to cause oscillation should be as much of the total delay as possible and the amplifier circuit delay $\delta$ should be as negligible as possible so that the external field will have the greatest possible effect on oscillator output frequency (or phase) that is:

$$\delta \ll \Delta$$

for accurate measurement and minimum sensitivity.

The RF signal level in the transmission line 61 should be relatively low, on the order of tens of millivolts, so that the RF magnetic field does not change the position of the field magnetization vector appreciably. Delay line 61 may be the delay line for an embodiment such as illustrated in FIGS. 1–9. In these embodiments a magnetic film as film 33 of FIG. 5 may be utilized although, of course, other forms of magnetic substances and types of deposition might be utilized.

Simple amplitude clipping techniques in the amplifier 62 may be used to control the signal amplitude. Amplifier 62 may be any device capable of amplification and oscillation in conjunction with the delay line.

While not to be construed as limiting the scope of the invention since within its purview many devices may be used as frequency detector 73, a counter capable of counting to the frequency employed as the Hewlitt-Packard 5244L frequency counter could be utilized.

Alternatively to sending the delay to frequency monitoring equipment as in FIGS. 10 and 12, a phase comparator could also be used to monitor the phase shift from input to output as a function of external field strength.

Although also not to be construed as limiting the scope of the invention, for example a frequency or phase discriminator such as is used in frequency or phase modulation (FM or $\phi$M) radio could be employed or any frequency or phase discriminator capable of providing D.C. output the change of which is proportional to frequency change could be employed.

Refer to FIG. 11. Two delay lines 71 and 72 may be provided and may be magnetized with initial polarization such as in the directions shown in FIG. 11. Delay lines 71 and 72 could be used with the appropriate comparison circuitry, to measure the external magnetic field since the field will increase the delay in one line, and reduce it in the other. The directions of signal propagation along delay lines 71 and 72 are as illustrated by the arrows at the left hand side of FIG. 11. Such methods of comparison are effective also to reduce temperature and instability since the opposite direction polarization and signal propagation cancel out effects due to such ambient conditions. It will be understood also that the invention is not limited to two lines with respective orientations in two directions. An embodiment employing three orthogonally oriented lines could be used for obtaining total field measurement.

From the foregoing, it will be understood that the inventive method employs apparatus which is capable of measuring an RF signal delay to convert the information into readily measurable, or observable form. The constant of proportionality can be found by measuring fields of known strength. The field direction is determined by changing the orientation of the delay line of the invention relative to the field to be measured until the delay is maximized or minimized.

Refer again to FIGS. 1 and also to FIGS. 2, 9, 10, 11, and 12, for example. An accurate measurement is obtained by orienting the transmission lines of any of FIGS. 2 to 9 or 11 which may be respectively transmission line 91, 92 or 82 parallel and then anti-parallel to an external magnetic field and determining the difference between maximum and minimum delays obtained. This measurement eliminates the need for an accurate calibration of the delay under zero external field conditions, and minimizes the effects of temperature and other ambient mechanisms.

Where, as shown in FIG. 11, two transmission lines 71 and 72 are employed oriented so that their easy axes are normal to each other, an external applied field with a longitudinal component reduces the delay in one of the transmission lines 71 or 72 while increasing it in the other. As above, maximizing the difference in delays and determining the different magnitude will provide field magnitude and direction.

Refer to FIG. 13. FIG. 13 illustrates an additional means and method utilizing a transmission line to measure a magnetic field. The delay line, generally indicated by the arrow 81, may be of the type shown by any of the aforegoing figures. Delay line 81 is brought in proximity with the magnetic field to be measured (or the field to be measured may be applied to transmission line 81). In addition to the unknown field to be measured, as indicated by the arrows of FIG. 13 bearing the legend "EXTERNAL FIELD TO BE MEASURED," an external reference field may be applied to the transmission line 81. This external reference field may be obtained by providing a solenoid constructed of a non-magnetic conductor material, and oriented so that its axis is concentric with the center line (X direction) of the transmission line 81. Thus, in the apparatus of FIG. 13, a current source 83 and a winding 82 are provided and connected such that the external field is obtained by utilizing the solenoid comprising the transmission line 81 and the winding 82 which is wound around the transmission line 81 concentric with the X direction or center line of transmission line 81. Conductor 82 which is provided is formed of a non-magnetic material. The transmission line 81 and the unknown field to be measured are positioned so that the unknown field to be measured is made parallel or anti-parallel to the transmission line 81. This is done by orienting the transmission line and moving it about with respect to the external field to be measured until a maximum or minimum delay is obtained.

With the unknown field thus made parallel or antiparallel to the transmission line 81, a current from current source 83 is passed through the solenoid conductor 82 in a direction to produce a cancelling field. A reference standard delay line, or an oscillator (not illustrated), whichever is desired may be provided and can be used to determine when the unknown field is completely cancelled. Determining the solenoid current required to produce the cancelling field gives a measure of the strength of the unknown field.

In the cancelling field method, a solenoid 6 inches long and 0.5 inch in diameter would require about 0.6 ampere-turns to cancel a 15 ampere-turn per meter unknown field.

Refer again to FIGS. 2, 3, 4 and 5. The transmission lines shown in these figures are of the balanced type. The principle discussed hereinabove, however, also applies to unbalanced transmission lines such as that of the embodiment of FIGS. 6 and 7 in which the bottom conductor (as bottom conductor 40) becomes a ground plane, with dimensions which are large compared to the width of the top conductor (as top conductor 43). Such a configuration may be more suitable for fabrication since the ground plane can be used as the substrate for the deposition or attachment of the magnetic, insulator and top conductor layers e.g. deposition of magnetic layers 33, insulator layers 32 and top conductor layers 43. Refer to FIG. 7. Although the invention is not to be construed as limited to such materials, the materials and dimensions could be as follows: The substrate 40 may be made of copper. The magnetic material 41 could comprise an 80% nickel-20% iron Permalloy. The dielectric layer 42 could be silicon-oxide compounds. The top conductor 43 may be constructed of copper. Vacuum evaporation techniques, in which the Permalloy 33 is deposited in the presence of a magnetic field, are suitable in fabricating this embodiment device of the invention.

Refer to FIG. 2. Typical dimensions may be as follows: $T=10$ microns, $h=5$ microns, $b=10$ mils, $l=4$ inches.

With these dimensions and materials, the characteristic impedance of the line will be of the order of 40 ohms and the delay will be of the order of 30 nanoseconds. When the delay line is used as a feed-back element with an inverting amplifier as exemplified in FIG. 10 and 12, for example, the fundamental frequency of oscillation would be about 16 megacycles.

Magnetic films such as could be employed as the magnetic material in the delay lines of the figures (see FIGS. 4, 5, 6, 7, 9, and 11) may have an anisotropy field $H_K$ of about 100 ampere-turns per meter. If the transmission line is placed parallel and then anti-parallel to an exernal field such as the earth's gravitational field (which is about 15 ampere-turns per meter) the total change in delay is about 20 percent, neglecting demagnetizing field effects. The longitudinal demagnetizing field may reduce this level of sensitivity by 2 to 4 times.

Obviously, other modifications are also contemplated and are within the scope of the invention. Other suitable materials and dimensions than shown in the illustrative embodiments and specific examples may be utilized. Various types of means to effect mechanical or electrical orientation of the magnetometer with respect to the external field, various ways to apply a magnetic field and to measure delay could be utilized other than those expressly shown by way of example. Various ways of determining change in phase, change of frequency, or measuring the differences in delay of propagation along a transmission line other than those illustrated by way of example and in the various combinations of features of the several figures shown, may be utilized without departing from the scope of the invention claimed herein.

While specific embodiments of the invention have been shown and described, it should be recognized that the invention should not be limited thereto. It is accordingly intended in the appended claims to claim all such variations as fall within the true scope of the invention.

What is claimed is:

1. A magnetometer comprising
   (a) a transmission line of the parallel flat type,
   (b) said transmission line being a delay line and comprising a first and a second conductor,
   (c) magnetic material capable of assuming opposed states of residual flux density along a preferred axis of magnetization, said magnetic material being of high relative permeability in the hard axis direction and low permittivity and being interposed between said conductors,
   (d) means operatively connected to said transmission line to propagate electromagnetic wave energy down the length of said line, thereby generating within said magnetic material an H magnetic field in a direction transverse to the direction of propagation of said wave energy,
   (e) said magnetic material being oriented with its preferred axis oblique to the H field in said transmission line such that maximum permeability occurs along the hard axis,
   (f) means coupled to the opposite ends of said transmission line and responsive to the delay of electromagnetic energy propagated along the line caused by application thereto of an external magnetic field having a component transverse to the preferred axis of said magnetic material to measure the delay caused by the presence of said external field.

2. The apparatus of claim 1, wherein
   (a) the material of said first and second conductors is copper,
   (b) the material of said magnetic material interposed between said conductors is permalloy of an approximate ratio of 80% of nickel and 20% iron,
   (c) a dielectric layer is interposed between said first and said second conductor,
   (d) the material of said dielectric layer comprises silicon-oxide compounds.

3. The apparatus of claim 2 wherein
   (a) said permalloy is a film deposited by vacuum evaporation in the presence of a magnetic field, such that maximum permeability occurs at field strengths below the coercive field of the film in a direction transverse to the direction of uniaxial anisotropy and said magnetic material has a relative permeability with respect to free space of approximately 4,000 in the direction of the H field and a permittivity near that of free space.

4. The apparatus of claim 1 wherein
   (a) said means to propagate electromagnetic wave energy down the transmission line comprises an RF signal generator connected to the input of said transmission line,
   (b) said apparatus further comprises a termination means connected to the output of said transmission line and responsive thereto,
   (c) said transmission line being adapted to be oriented with respect to the external magnetic field to determine maximum and minimum delay to thereby determine the direction of said external magnetic field, and
   (d) said means responsive to the delay of electromagnetic energy providing an indication of the amount of delay which is a function of the magnitude of an external field to be measured,
   (e) said apparatus thereby providing means to determine the direction and magnitude of said magnetic field.

5. The apparatus of claim 1 wherein
   (a) said means to propagate electromagnetic wave energy down the delay line comprises an amplifier,
   (b) means to connect said delay line in the path between the output and input of said amplifier in regenerating feedback circuit configuration to thereby cause said amplifier and said delay line to oscillate as an oscillator,
   (c) said means responsive to the delay of electromagnetic energy propagated along the line being frequency monitoring equipment comprising a frequency detector responsive to the output frequency of said oscillator,
   (d) said delay line being adapted to be positioned in relation to an external magnetic field such that the frequency detector may detect the maximum and minimum frequencies of the output of said oscillator to thereby determine the strength and orientation of said external magnetic field.

6. The apparatus of claim 1 wherein said transmission line comprises
   (a) a conductive substrate,
   (b) a deposited high permeability oriented magnetic film,
   (c) an insulator material film deposited on said high permeability oriented magnetic film,
   (d) a top conductor superimposed upon said insulator film,
   (e) said substrate, oriented magnetic film, insulator film and top conductor thereby comprising a deposited delay line magnetometer,
   (f) the permeability of the magnetic material multiplied by its thickness being many times greater than the permeability of said insulator material multiplied by the thickness of said insulator material,
   (g) said means to propagate electromagnetic wave energy down the transmission line effecting transmission of energy in the TEM mode,
   (h) said orientation of said magnetic material with the easy axis at an angle to the H field in the transmission line making the delay per unit length most sensitive to external fields.

7. The apparatus of claim 1 and including,
   (a) a second transmission line positioned parallel to the first transmission line,
   (b) said second transmission line comprising magnetic material oriented with its preferred axis oblique to the H field in said second transmission line, said first and second transmission lines being positioned with respect to each other such that the respective preferred axes of the magnetic material of said first and second transmission lines lie in directions normal to each other,
   (c) second means operatively connected to said second transmission line to propagate electromagnetic wave energy down the second transmission line in the opposite direction to the propagation along the first transmission line, and (d) means coupled to the opposite ends of said second transmission line for measuring the delay of electromagnetic energy propagated along said last mentioned line in response to the presence of an external field applied concurrently to said lines, (e) said field increasing delay in one line, and reducing it in the other by virtue of the magnetic orientation and the delay in signal propagation down both lines.

8. The apparatus of claim 1 wherein
(a) the means operatively connected to said transmission line to propagate electromagnetic wave energy down the transmission line further comprises means to provide a relatively low level RF signal of the order of tens of millivolts so that the magnetic field due to the RF signal does not change the position of the magnetic material magnetization vector appreciably,
(b) said transmission line further comprising means to apply an external reference magnetic field to the transmission line in addition to the external magnetic field to be measured,
(c) said last-named transmission line means comprising a conductor of non-magnetic material wound and oriented so that its axis is concentric with the X direction which is the center line of the transmission line, said non-magnetic conductor material forming a solenoid,
(d) means coupled to said conductor for causing current flow therethrough in a direction to produce a cancelling field with respect to the unknown field,
(e) the magnitude of the solenoid current required to cancel said unknown field providing a measure of the unknown field strength.

9. The magnetometer of claim 1 wherein
(a) said transmission line is a balanced transmission line,
(b) said conductors comprise a top and a bottom conductor of copper material,
(c) said magnetic material interposed between said top and bottom conductors is composed of Permalloy material,
(d) said top and bottom conductors each comprises a flat elongated plate of rectangular shaped configuration, and
(e) a dielectric layer interposed between at least one of said plates and said magnetic material.

10. The magnetometer of claim 9 wherein
(a) said conductor plates are spaced apart approximately 10 microns,
(b) each of said top and bottom conductor plates has a thickness of approximately 5 microns,
(c) each of said conductor plates has a width of approximately 10 mils,
(d) each of said conductor plates has a length of approximately 4 inches,
(e) the transmission line thereby has a characteristic impedance of the order of 40 ohms and a delay of the order of 30 nanoseconds.

11. The magnetometer of claim 1 wherein said means operatively connected to said transmission line to propagate electromagnetic wave energy down the length of said line comprises
(a) an inverting amplifier connected in association with said transmission line such that said transmission line is connected as a feedback element between the output and input of said amplifier to provide an oscillator,
(b) said transmission line and amplifier having parameters and characteristics such that the oscillator has a fundamental frequency of about 16 megacycles, (c) said magnetic material being of characteristics and dimensions to have an anisotropy field of about 100 ampere-turns per meter.

12. The magnetometer of claim 1 including
(a) conductive wire means of non-magnetic material wound around said transmission line to provide a solenoid and
(b) means coupled to said solenoid to cause current flow therethrough in a direction to cancel the delay in said transmission line caused by said external magnetic field applied to said transmission line.

13. A method of measuring the direction and strength of an unknown magnetic field comprising the steps of
(a) biasing with a bias magnetic field a first parallel plate transmission line comprising a top and bottom conductor plate, an insulator layer and a film of magnetic material therebetween in a direction to orient the magnetic material with the easy axis oblique to the H field in the transmission line, such that maximum permeability occurs along the hard axis and permittivity near that of free space results to thereby reduce propagation velocity,
(b) propagating electromagnetic wave energy down the transmission line in the TEM mode keeping the electromagnetic wave energy of small magnitude so that its field does not disturb the field magnetization vector significantly,
(c) converting the delay in propagating down the line into readily measurable and observable form,
(d) bringing the transmission line into the vicinity of the unknown field and changing the orientation of the transmission line with respect to the unknown magnetic field until a maximum and a minimum delay are observed to obtain the direction of the unknown field,
(e) measuring the difference between maximum and minimum delays observed,
(f) determining the magnitude of the external field in accordance with said measured difference.

14. The method of claim 13 including the steps of
(a) positioning a second similar type transmission line parallel to and aligned with the first transmission line,
(b) orienting the easy axis of the magnetic material of said second transmission line with respect to the easy axis of the magnetic material of said first transmission line, such that the easy axes of said transmission lines are normal to each other,
(c) propagating RF signals down the lines in opposite directions,
(d) bringing said second transmission line into the vicinity of said unknown field whereby said field is applied concurrently to said first and second lines, said external magnetic field reducing the delay in RF signal propagation in one transmission line while increasing it in the other, and
(e) measuring the maximum delay in said second transmission line, the difference magnitude of the maximum delays respectively in said first and second lines providing the field magnitude and direction of said unknown field.

15. The method of claim 13 including the steps of
(a) applying in a direction to produce a field cancelling said unknown field an external reference magnetic field to the transmission line in addition to the unknown field to be measured,
(b) positioning the transmission line selectively parallel or anti-parallel to the unknown field, by moving the transmission line about with respect to the external unknown field until a maximum or minimum delay is obtained,
(c) changing the direction where necessary and changing the magnitude of the applied reference magnetic field until the unknown field is cancelled, and
(d) determining the external reference field required to produce the cancelling field to give a measure of the unknown field strength.

References Cited

UNITED STATES PATENTS

| | | | |
|---|---|---|---|
| 2,844,789 | 7/1958 | Allen | 324—43 |
| 2,972,105 | 2/1961 | Ghose | 324—43 |
| 3,257,629 | 6/1966 | Kornreich | 333—31 |
| 3,399,361 | 8/1968 | Belson | 307—298 |
| 2,694,793 | 11/1954 | Martin | 324—43 |

OTHER REFERENCES

Kornreich et al.: Variable Delay Magnetic Strip Line, Journal of Applied Physics, vol. 34, No. 4 (part 2), April 1963, pp. 1169–1170.

Thomas, H.: Magnetically Controllable Delay Line, I.B.M. Technical Disclosure Bulletin, vol. 8, No. 11, April 1966, pp. 1592–1593.

ARCHIE R. BORCHELT, Primary Examiner

R. J. CORCORAN, Assistant Examiner

U.S. Cl. X.R.

333—31, 84